United States Patent [19]

Lavie

[11] Patent Number: 4,661,133
[45] Date of Patent: Apr. 28, 1987

[54] METHOD FOR HEAT AND MASS EXCHANGE OPERATIONS

[75] Inventor: Ram Lavie, 33 Italy Str., Danya, Haifa, Israel

[73] Assignees: Technion Research & Development Foundation Ltd., Technion City; Ram Lavie, Haifa, both of Israel

[21] Appl. No.: 737,229

[22] Filed: May 23, 1985

[30] Foreign Application Priority Data

Jun. 8, 1984 [IL] Israel .................................. 72058

[51] Int. Cl.$^4$ ............................................. B01D 53/08
[52] U.S. Cl. .......................................... 62/18; 55/70; 55/73; 55/77
[58] Field of Search ................. 62/18, 17, 36; 203/41; 55/68, 70, 73, 74, 75, 77–79

[56] References Cited

U.S. PATENT DOCUMENTS 3,839,847 10/1974 Bankiotes et al. ...................... 62/18
4,367,082 1/1983 Tomisaka ................................ 62/18

Primary Examiner—Frank Sever
Attorney, Agent, or Firm—Browdy and Neimark

[57] ABSTRACT

The present invention relates to a method for carrying out simultaneous heat and mass exchange operations between two input streams, where a gradient of at least 30 degrees C. exists between the streams, each stream containing at least two components. According to the invention, the two streams are introduced into a reactor containing a solid or liquid adsorbent material, which retains at least one component preferentially to the other components. The adsorbancy power of the component by the adsorbent material is higher at lower temperatures than at high temperatures. A stream results from the reactor in which the diluted component becomes more concentrated in respect to the input stream. The equilibrium concentration of the adsorbable species in the adsorbent, at the conditions of the colder stream, is higher by at least 0.01 g adsorbed species per g adsorbent than that prevailing at the conditions of the hot feed. The method is applicable to a number of processes such as gas purification, distillation, process-air drying, air conditioning, air enrichment and internal combustion engines. The method imparts appreciable savings in energy requirements and improved mass transfer efficiency for processes wherein heat and mass exchange operations are involved.

16 Claims, 8 Drawing Figures

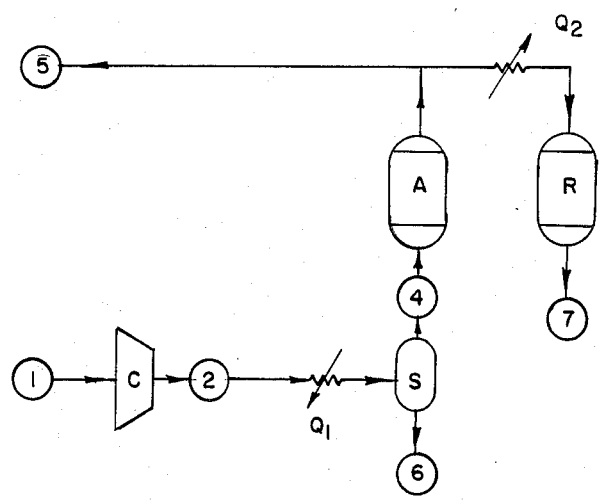
FIG. 4a
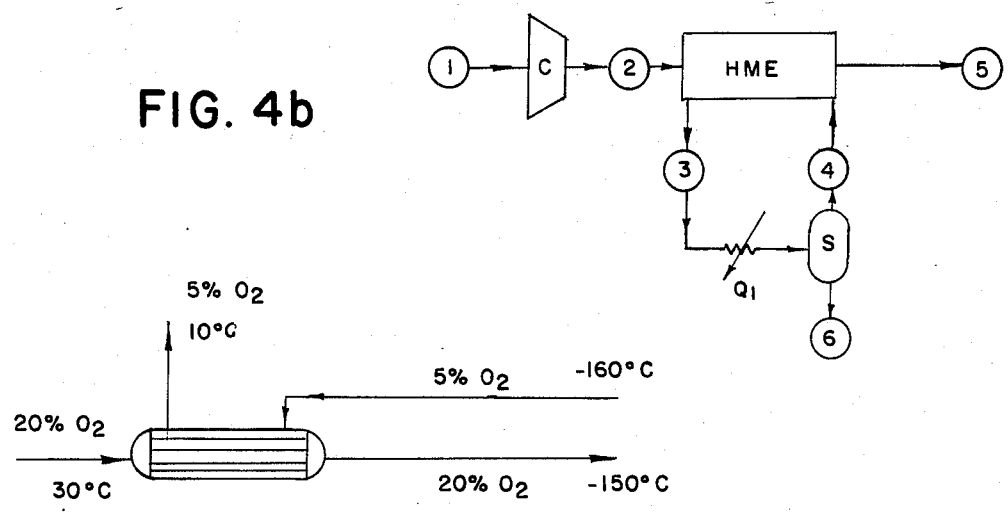
FIG. 4b
FIG. 5a
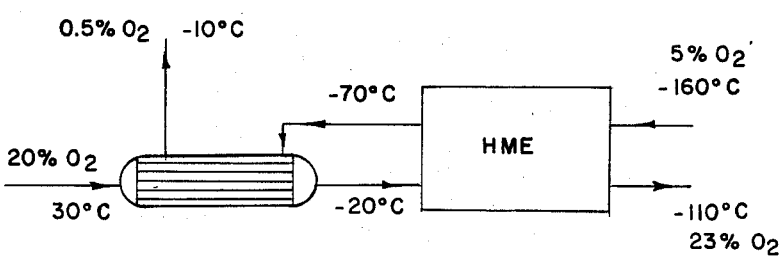
FIG. 5b

METHOD FOR HEAT AND MASS EXCHANGE OPERATIONS

The present invention relates to a method for carrying out heat and mass exchange operations. More particularly, the invention relates to an improved method for carrying out heat and mass exchange operations which involves significant decrease of energy required for their performance.

Mass exchange between two phases is of particular importance largely because it is involved in most separation processes, as for example in the recovery of a pure product from a mixture. Most practical schemes are based on the fact that concentrations of two phases in equilibrium with each other are quite different. Any method of contacting two phases which results in the selective interphase transport of one of the constituents can form the basis of a separation process. The selectivity can be the result of different equilibrium composition for the different species or it may be due to different rates of transport of the several constituents. Thermodynamic work potential of several kinds may serve to implement mass exchange. In electrochemical processes, an electrical potential provides the motive force, while in a column for the separation of gaseous isotopes, it is a thermal gradient. However, in the majority of applications in the process industries, it is the concentration gradient which provides the driving force to effect mass exchange between two phases. This is a well established operation carried generally in a multi-stage operation such as in distillation towers, mixer-settler units, and is based on well-known theory. Thermodynamic considerations require that work be invested in a system in order for its components to be separated, involving a decrease in entropy.

Heat transfer between a relatively hot body and a relatively cold body is also a well established unit operation that is carried in a variety of devices such as heat exchangers, heat regenerators etc.

There exist in nature and in industry particular situations where two streams of similar compositions and different temperatures are available and it is beneficial to exchange heat between those streams while it would be equally beneficial to have some component(s) transferred from the stream that is relatively dilute in this particular component(s) to the other stream that is relatively concentrated in this same component(s). Typical examples of such situation are in the manufacture of ammonia or in the separation of oxygen from air.

In the manufacture of ammonia, it may be beneficial to utilize the thermodynamic work potential provided by the transfer of heat, whereby the hot input stream is tagged as a heat source and the cold input stream is tagged as a heat sink, to drive the separation process in the desired direction, the entire process occurring in one operation. This integration may be beneficial both from the point view of energy utilization and by virtue of the compactness of the equipment which would perform two functions simultaneously.

The preparation of oxygen, on the commercial scale, is made mainly from atmospheric air. Most processes based on atmospheric air involve two steps which are distinct even when combined in one piece of equipment: (1) the liquefaction of air (preceded by a purification consisting of moisture, carbon dioxide and other impurities removal) and (2) separation of oxygen from the nitrogen by fractionating the liquid in a distillation column. For practical purposes air may be considered a binary mixture, or solution of nitrogen and oxygen. Air separation plants often discard away a stream of partly separated air, containing 5 to 10% oxygen, in order to economically balance the simultaneous production requirements for pure oxygen and nitrogen. As all other streams in such a plant, it is originally quite cold, justifying cold recovery prior to its venting to the atmosphere. Therefore, heat and mass exchange recovery of at least some of its oxygen content as a by-product, appears to be an attractive object thereby raising the oxygen content of the air fed to the plant and thus facilitating the oxygen production. The above short review clearly points out the need for a method for carrying out heat and mass exchange operation whereby the economy aspects of various processes are improved. Thus the invention relates to a method for carrying out heat and mass exchange operations in a reactor containing a reagent, between two input streams, each stream containing at least two components and possessing a temperature gradient of at least 30 degrees centigrade and the concentrations of the adsorbable species in the cold and the hot feed streams, being such that the equilibrium concentration of the reagent at the conditions of the cold feed streams be higher than that prevailing at the conditions of the hot feed streams wherein said reagent is capable of retaining preferiantially one component as compared to other component(s) or is inert towards the other component(s), the power of retaining of said reagent being higher at lower temperatures than at high temperatures utilizing the thermodynamic work potential provided by the transfer of heat between said two streams to drive the process in the desired direction, obtaining a stream in which the diluted component becomes more diluted while the concentrated component becomes more concentrated in respect to the input stream.

The method imparts appreciable savings in energy requirements as well as in mass transfer efficiency for a broad number of processes wherein heat and mass exchange operations are involved, provided that they possess the gradients of temperatures and concentrations within the above mentioned ranges.

The principle of operation is very simple and will be clearly understood by the following illustrative example: Let us consider two fluid mixtures each consisting of two chemical components A and B, and an adsorbing reagent S which is capable of adsorbing some of A but it is inert towards B. The adsorption power of the adsorbing reagent S towards A is high at low temperatures and low at high temperature. The adsorbing reagent S is present in a column through which a hot concentrated mixture is fed at one end (tagged for identification as top) and extracted at the other end (tagged for identification as bottom). After passing the mixture through the column for a certain period of time (to be called part I of a cycle), the feeding of the column in this manner is stopped and a cold dilute fluid is fed at the bottom for a period of time (to be called part II of a cycle) and extracted at the top of said column. These operations are iterated periodically over a large number of cycles whereby the following will result:

(a) The adsorbent matrix will act as a heat regenerator whereby heat is transferred during part I of a cycle from the hot fluid to the matrix and thus cooling the fluid, and during part II of a cycle being transferred from the matrix to the cold fluid and thus heating the fluid.

(b) The adsorbent matrix acts as an adsorber/-desorber whereby component A is adsorbed during part II of the cycle to that part of the matrix that has already been cooled by the cold fluid and component A is thus removed from this stream. During part I of the cycle, the component A is desorbed from that part of the matrix that has already been heated by the hot fluid and component A is thus added to this stream.

The overall efficiency of the process will depend on a number of factors such as: the amount and adsorbing power of the adsorbing reagent as a function of temperature; the heat capacities of the adsorbing reagent and of the fluids; flow rates, temperatures and compositions of the inlet streams and the thermodynamical properties of the materials involved.

The adsorbent reagent can be selected from a large groups of known compounds used in the art. Typical reagents include alumina, silica gel, zeolites, various forms of carbon such as charcoals and carbon black, metal powders, organic compounds such as sugars and starches and various polymers. In particular preferably for the present invention will be an adsorbent reagent whereby the equilibrium conditions of the cold feed stream is higher by at least 0.01 g adsorbed species per gram adsorbent than that prevailing at the conditions of the hot feed stream.

The method according to the present invention can be envisaged to be implemented in a number of chemical processes, some of them being hereafter enumerated being understood that this enumeration should not be limited thereto.

1. Gas purification: there are many cases where gas purification is required and the feed containing the impurity to be removed being also hot and involving cooling prior to its introduction into the absorption tower, from which it emerges as a relatively pure and cold stream. Using the method according to the present invention with the feed and effluent, will result in a further purification or decrease in the load on the purification plant particularly at the low concentration end which is the most critical part in the process.

2. Distillation operation: where a temperature gradient exists between a hot feed and a cold top product. Using the method according to the present invention will result in an additional separation which would again decrease the load of separation at the low concentration end.

3. Process air drying: there are many cases when a hot dry process air is required. The use of the method according to the present invention, will provide heating and drying (possible enrichment in oxygen) of cold atmospheric air by an exchange with hot flue gases.

4. Processes wherein significant amounts of reactants are recycled to a converter and where the costs of separation limit the purity of the recycled reactants and where preheating of the reactants fed to the converter are desirable. A typical example of such process is the manufacture of ammonia from hydrogen and nitrogen.

5. Air conditioning: the goal being to purify and preheat a cold polluted air supply to a building by means of hot flue gases exiting to stack.

6. Internal combustion engine: the goal being to improve the efficiency by drying and/or oxygen enrichment and preheating of the air using the method according to the present invention with the exhaust gases.

Some specific Examples illustrating the method and results obtained thereto will be further presented in the specification.

The method according to the present invention is characterized by its versatility and various embodiments may be conceived using the principle as described above.

BRIEF DESCRIPTION OF THE DRAWINGS

FIG. 4 is a schematic flowsheet for air drying: 4(*a*) using the conventional method and 4(*b*) using the present invention;

FIG. 5 is a schematic flowsheet for air separation boosting: 5(*a*) using the conventional method and 5(*b*) using the present invention.

According to one embodiment (I) the operation is carried out in at least one pair of adsorption beds which are thermally insulated from their enclosures. The mode of operation was already described under the principle of operation as given above. Switching valves are directing the streams alternatingly into and out of each bed in a programmed sequence.

Figure 1:
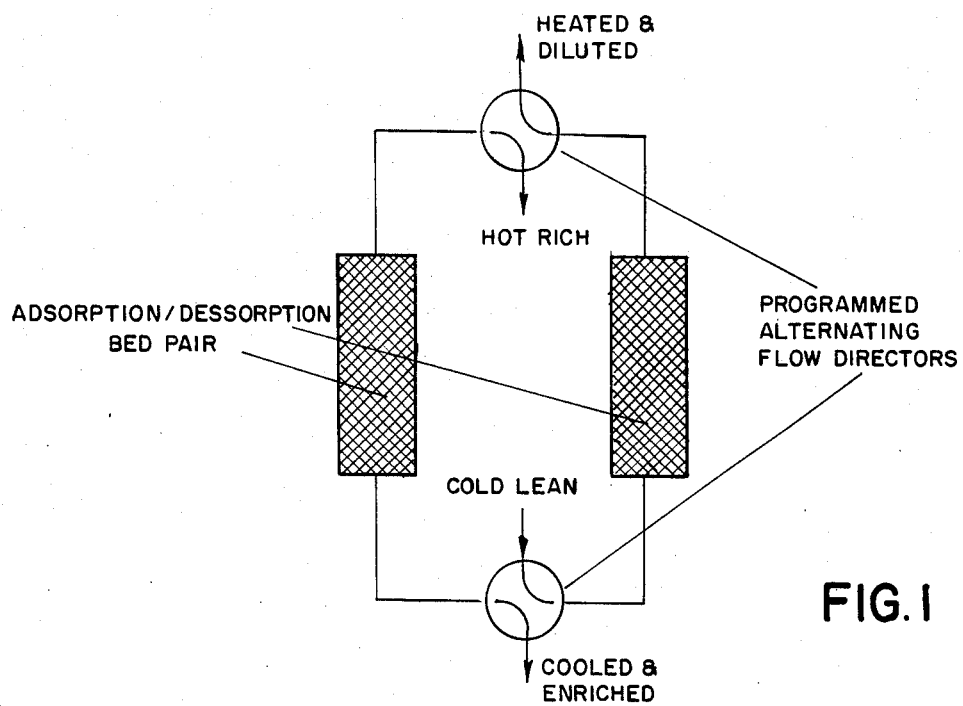
FIG. 1 is a schematic illustration of an embodiment utilizing a pair of adsorption beds.

A variation of the above embodiment would replace the on-off switching valves with a unified flow distributor that would perform the same functions. Another variation of this embodiment would redirect the effluents exiting the adsorbent beds during those parts of the cycles that are relatively inefficient either in terms of the heat transferred or in terms of the mass transfer, to be passed from one stream to another or to be reprocessed within the same system or separately processed in a conventional heat exchanger or separated by any other means. When fluctuation of the temperature or compositions of effluents is detrimental to the system, several pairs of beds may be operated in parallel while phased in time through control means of the flows directions by means of a programmed flow guide or switching valves system. A schematic illustration of this embodiment is given in FIG. 1.

Figure 2:
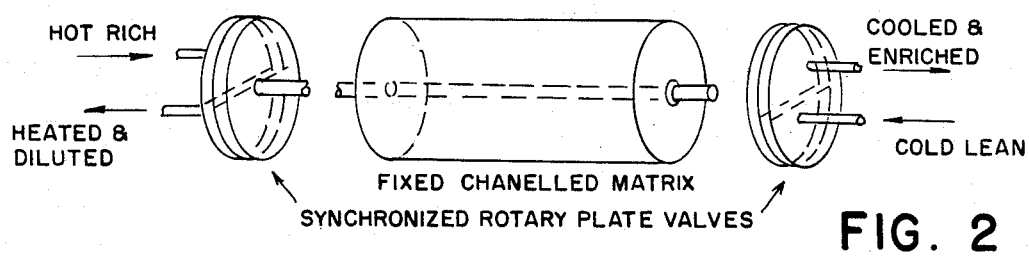
FIG. 2 is a schematic illustration, wherein the adsorbent reagent is in a solid form in a fixed channelled matrix.

According to another embodiment (II), the solid matrix is structured such that bulk flow is facilitated in a preferred direction (axial or radial) and inhibited otherwise such as for example by means of axially directed channels. Thus, each channel in the matrix can act effectively as a separate heat-mass exchanger by itself. An overall external enclosure for the matrix might be desirable. Two synchronized rotary flow distributors located at both ends of the matrix direct the flow to each channel in a proper sequence such that a single matrix operates as a multitude of adsorber/desorber heat regenerator pairs. The resulting effect will be substantially the same as that of embodiment (I), but the effluents conditions are inherently smoothed to steady constant values. A schematic illustration of this embodiment is given in FIG. 2.

A slight modification to the above embodiment is the case when the flow distributors are fixed while the matrix itself is rotated to obtain the same result. This embodiment may be preferred in case where the matrix weight is not excessive.

Figure 3:
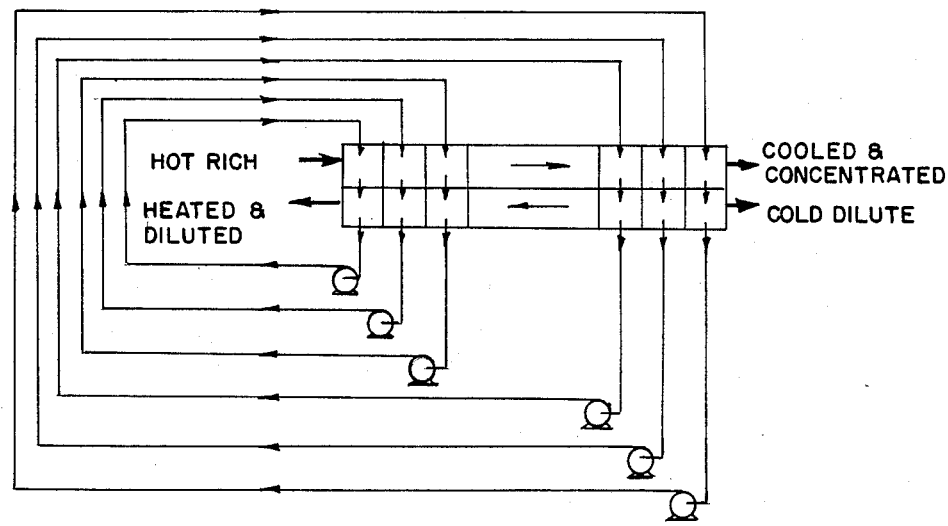
FIG. 3 is a schematic illustration wherein the adsorbent reagent is in a liquid form.

According to another embodiment, an adsorbent reagent S, in the form of fluid is used, thereby facilitating its movement. The system consists of two parallel batteries of fluid-fluid contactors/phase separators stages where the heavy fluid reagent S is circulated between the corresponding stages in the two series while the light fluid streams that are to be processed are fed continuously at opposite ends of their respective battery and flow through consecutive stages until they are withdrawn at the other end of the battery. The net effect obtained is almost identical to that obtained in the previous embodiment except that the reagent is circulated only between two phases of operation. A schematic illustration of this embodiment is given in FIG. 3. This embodiment can also be operated in the same way, when the adsorbent reagent S is in the form of a moving solid bed.

The above embodiments, while not being exhaustive, show clearly the versatility of the present invention. The method has clear and net advantages for the particular instances where both heat and mass exchange are simultaneously desirable to occur.

The devices required for the method according to the present invention are characterized by their simplicity and compactness. Although in principle the method may utilize either solid-fluid or liquid-fluid systems, the latter seems to have the advantage of being inherently continuous and steady in operation. A person skilled in the art after reading the present specification, will appreciate the merits of the invention and will select the proper system depending on the materials properties, conditions and process objectives.

The invention will be further illustrated by a number of Examples as given below without being limited thereto. The system of heat and mass exchange operations according to the present invention will be hereafter denoted as HME (Heat and Mass Exchange).

EXAMPLE 1

High pressure ammonia synthesis enhancement retrofit.

Two insulated beds (A and B) each containing 3 kg of granulated active carbon (type BPL 12×30 produced by Pittsburgh Activated Carbon) were alternatingly subjected for periods of 5 minutes each, to a flow of 70 gmole/min of a gas mixture at the following conditions:

|  | Hot feed to bed A | Cold feed to bed B |
|---|---|---|
| Pressure (atm.): | 300 | 300 |
| Temp. (deg. Cent): | 390 | 30 |

|  | Hot feed to bed A | Cold feed to bed B |
|---|---|---|
| % $NH_3$ (by vol.): | 16 | 8 |
| % $H_2$ (by vol.): | 49.5 | 55.5 |
| % $N_2$ (by vol.): | 16.5 | 18.5 |
| % $CH_4$ (by vol.): | 12 | 12 |
| % A (by vol.): | 6 | 6 |
| flow direction: | top to bottom | bottom to top. |

After about eight cycles of operation, the effluent conditions were determined the results being as follows:

|  | Cold effluent from bed A | Hot effluent from bed B |
|---|---|---|
| Average temp. degrees centigrade: | 158 | 238 |
| Average $NH_3$ % by vol.: | 20.6 | 3.1 |

The above show that using the HME according to the present invention, the two desired goals were achieved: the effluent from the hot feed bed had a higher ammonia content and a lower temperature than in the feed, while the effluent from the cold feed to the second bed had a lower ammonia content and a higher temperature than in the feed.

EXAMPLE 2

Air Drying

Many processes require a supply of dry (compressed) air. The general method for its manufacture comprises the following basic operations: (a) compression; (b) cooling; (c) separation of the condensed humidity and (d) drying in an adsorption battery which is mostly periodically regenerated thermally by an external power source or by self purging. A schematic flowsheet of the conventional method is given in FIG. 4(a).

FIG. 4(b) represents the flowsheet using the HME system according to the present invention. The manufacture in this case is much simplified, with improved yield and reduced energy consumption. In this case, the driving force resulted from the heat generated in the compression step. The improved results and advantages of the method are summarized in Table 1, wherein a comparison of conditions prevailing in the conventional plant and these according to the present invention are summarized (the steps and streams refer to the FIGS. 4(a) and 4(b).

TABLE 1

Comparison of conditions prevailing in a conventional plant and in a plant with HME system for air drying.

|  | 1 | 2 | 3 | 4 | 5 | 6 | 7 | $Q^1$ | $Q^2$ |
|---|---|---|---|---|---|---|---|---|---|
| (a) Conventional drying process (refers to FIG. 4a). |  |  |  |  |  |  |  |  |  |
| Temp. deg. C. | 30 | 130 |  | 30 | 30 | 30 | 130 |  |  |
| kmoles air (dry) | 100 | 100 |  | 100 | 80 | — | 20 |  |  |
| kmoles $H_2O$ | 5 | 5 |  | 1.25 | — | 3.75 | 1.25 |  |  |
| kcal |  |  |  |  |  |  |  | −100,000 | +50,000 |
| (b) HME drying system (refers to FIG. 4b). |  |  |  |  |  |  |  |  |  |
| Temp. deg. C. | 30 | 130 | 110 | 30 | 50 | 30 |  |  |  |
| kmoles air (dry) | 100 | 100 | 100 | 100 | 100 | — |  |  |  |
| kmoles $H_2O$ | 5 | 5 | 6.25 | 6.25 | — | 5 |  |  |  |
| kcal |  |  |  |  |  |  |  | −100,000 | — |

The above results clearly show the following advantages on using the method according to the present invention for air drying:

The amount of dry air produced is about 25% higher than in the conventional process.

No waste stream resulted using the HME system.

Compact equipment and simplicity of operation are involved.

No external heat ($Q^2$) is required with the HME system.

The amount of cooling ($Q^1$) remains substantially unchanged.

EXAMPLE 3

Air Separation Boosting

Air separation plants often discard-away a stream of partly separated air (containing about 4% to 10% oxygen) in order to economically balance the simultaneous requirements for pure oxygen and nitrogen. Since the streams in such plants are generally at low temperature, it is more than justified to recover their cold temperature prior to their venting to the atmosphere. Furthermore, an additional recovery of some oxygen present in such streams will be most desirable, thereby raising the oxygen content of the air fed to the plant and facilitating the oxygen production. A schematic flow sheet of a method utilizing the HME system is illustrated in FIG. 5.

A typical example with the results obtained is as follows:

Two insulated beds (A, B), each containing 1 kg of granulated Linde Molecular Sieve 13X (produced by Union Carbide) were alternately subjected, for periods of 5 minutes each, to a flow of air at the following conditions:

|  | Hot feed to bed A | Cold feed to bed B |
|---|---|---|
| Pressure (atm. abs.) | 2 | 2 |
| Temperature (deg. Cent.) | 30 | −160 |
| Flow rate (gmole/min) | 15 | 30 |
| % $N_2$ (by vol.) | 79 | 94 |
| % $O_2$ (by vol.) | 20 | 5 |
| flow direction | down | up |

After about eight cycles of operation the effluent conditions were as follows:

|  | Cold effluent from bed A | Hot effluent from bed B |
|---|---|---|
| Average temperature (deg. Cent.) | −110 | −70 |
| Average $O_2$ content (% by vol.) | 23 | 0.5 |

The above results clearly show the achievements obtained concerning the oxygen recovery from the stream of air to be discarded, along the improvement in the energy overall requirements.

EXAMPLE 4

Process Air Enrichment

A well known shortcoming of many processes utilizing process air such as furnaces, hydrocarbon reforming, carbon black manufacture, internal combustion engines, etc. is the necessity to handle and process a large amount of inert gas which is in fact a burden to the process and dilutes the reactants (fuel and oxygen). It is well known that much can be saved both in terms of equipment size and energy requirement by reducing the amount of the air constituents which are inert to the process (such as nitrogen and water). However the economics of conventional air separation prohibit its large scale use in this context. The use of the HME system according to the present invention provides a low energy air enrichment process to partially separate the undesired constituents from the process air feed stream, obtaining a feed which has a higher oxygen content and a higher temperature than the original stream.

Figure 6:
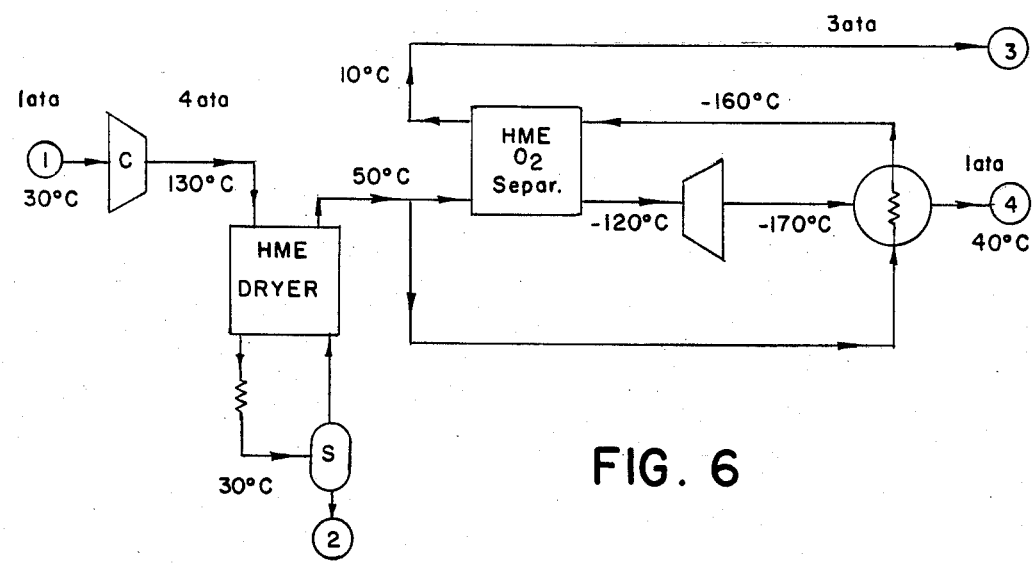
FIG. 6 is a schematic flowsheet with the relevant parameters and compositions for process air enrichment using the present invention.

A schematic flowsheet with the various conditions and compositions of the streams is presented in FIG. 6. The method is based on contacting two gaseous air streams of similar composition close to atmospheric pressure) but one of which is at cryogenic temperature, in a HME system whereby oxygen and some nitrogen are adsorbed from the cold stream while heating it and desorbed into the hot stream while cooling it. Thus one stream is enriched in oxygen while the other became lean. The necessary cold generation is provided by expansion. The HME system compares favourably with conventional existing methods, such as air separation by distillation or by conventional adsorption, both in terms of the compactness of the equipment and its simplicity of operation as well as in terms of the energy required to achieve a same result.

EXAMPLE 5

Internal Combustion Engine Booster

Internal combustion engines that are installed in various transportation vehicles (cars, ships, airplanes) are commonly fed with filtered atmospheric air which may contain several percents of $H_2O$. It is well known that air preheating may contribute to engine efficiency and there are indeed many engines which are equipped to preheat air feed by means of the motor heat. However the hot air being less dense than atmospheric air, will not provide as much oxygen for the combustion since the engine suction is a constant volumetric flow. This can be remedied by utilizing the HME system that will exchange heat between the engine air suction and its exhaust while at the same time, eliminating atmospheric air moisture from the air feed and thus providing more oxygen per unit of volume suction. This is in particular advantageously under the moist conditions prevailing on sea going ships, where the engine power would be boosted by several percents. The HME system may also be designed to exclude pollutants from the engine exhaust recirculating them back to the engine.

The results which are obtained with the HME system are summarized as follows:

| Source of stream | Entering into the HME | Exit from the HME |
|---|---|---|
| Atmospheric air (cold, humid) | 20 (deg. Cent.) | 100 (deg. Cent.) to engine, dryair |
| From engine exaust | 150 (deg. Cent.) | 70 (deg. Cent.) |

I claim:

1. A method comprising carrying out a simultaneous heat and mass exchange operation between two input streams, each stream containing at least two components and a there being a temperature gradient of at least 30 degrees Centigrade between the two streams, the two streams being designated a hot stream and a cold stream, by;

providing a reactor containing a reagent capable of preferentially retaining one component, the retaining power of the reagent being higher at lower temperatures than at higher temperatures, and the equilibrium concentration of the reagent at the conditions of the cold stream being higher than that prevailing at the conditions of the hot stream enabling the use of the thermodynamic work potential supplied by the transfer of heat between the two streams to drive the process in the desired direction;

feeding the hot stream into a first end of the reactor and extracting the hot stream from a second end of the reactor, feeding the cold stream into the second end of the reactor and extracting the cold stream from the first end of the reactor, and obtaining a stream in which a diluted component becomes more diluted while a concentrated component becomes more concentrated in respect to the input streams.

2. A method according to claim 1, wherein said reagent is a solid adsorbent material.

3. A method according to claim 2, wherein the solid adsorbent material is structured such that the bulk flow is facilitated in a preferred direction and inhibited otherwise by means of appropriately directed channels.

4. A method according to claim 3, wherein the solid adsorbent material is in the form of a moving bed.

5. A method according to claims 1, wherein said equilibrium concentration is higher by at least 0.01 g adsorbed species per gram adsorbent than that prevailing at the conditions of the hot feed stream.

6. A method according to claim 1, wherein said reagent is a fluid adsorbent material.

7. A method according to claim 6, wherein the system consists of two parallel batteries of fluid-fluid contactors/phase separators stages, where the heavy fluid reagent is circulated between the corresponding stages in the two series while the light fluid streams that are to be processed are fed continuously at opposite ends of their respective battery and flow through consecutive stages until they are withdrawn at the other end of the battery.

8. A method according to claim 1, wherein the two operations are carried out simultaneously in at least one pair of adsorption beds which are thermally insulated from their enclosures, switching valves directing the streams alternatingly into and out of each bed in a programmed sequence.

9. A method according to claim 8, wherein said switching valves are replaced by a unified flow distributor.

10. A method according to claim 9, wherein the flow distributors are fixed while the solid adsorbent mass is rotated.

11. A method according to claim 1, applied to gas purification.

12. A method according to claim 1, applied to distillation.

13. A method according to claim 1, applied to process-air drying.

14. A method according to claim 1, applied to air conditioning.

15. A method according to claim 1, applied to internal combustion engines.

16. A method according to claim 1, applied to air enrichment.

* * * * *